United States Patent
Powell

[11] 3,894,764
[45] July 15, 1975

[54] STABILIZER WING FOR A RACING VEHICLE

[76] Inventor: Jack N. Powell, Rte. 2, Leesburg, Ind. 46580

[22] Filed: July 18, 1974

[21] Appl. No.: 489,496

[52] U.S. Cl............... 296/1 S; 180/1 FV; 188/270; 244/42 DA
[51] Int. Cl............................................ B62d 37/02
[58] Field of Search ...... 296/1 S; 244/42 D, 42 DA; 180/1 FV; 46/202; 188/270

[56] References Cited
UNITED STATES PATENTS

| | | | |
|---|---|---|---|
| 3,326,318 | 6/1967 | Bevoise | 296/1 S X |
| 3,790,206 | 2/1974 | Backowski | 296/1 S |
| 3,791,468 | 2/1974 | Byran, Jr. | 180/1 FV |

Primary Examiner—Robert J. Spar
Assistant Examiner—Donald W. Underwood
Attorney, Agent, or Firm—Oltsch & Knoblock

[57] ABSTRACT

A stabilizer wing for a racing vehicle in which the wing includes a main airfoil to which a flap is attached at the trailing edge thereof. At least one and preferably two rudders are connected to the airfoil and extend upwardly therefrom with one of the rudders being fixedly positioned relative to the airfoil. The remaining rudder is pivotal relative to the airfoil and is connected by a suitable actuator to the flap so that as the racing vehicle rounds a curve the rudder is caused to pivot which in turn causes the flap to move to increase the downward pressure exerted upon the vehicle by the stabilizer wing.

6 Claims, 6 Drawing Figures

3,894,764

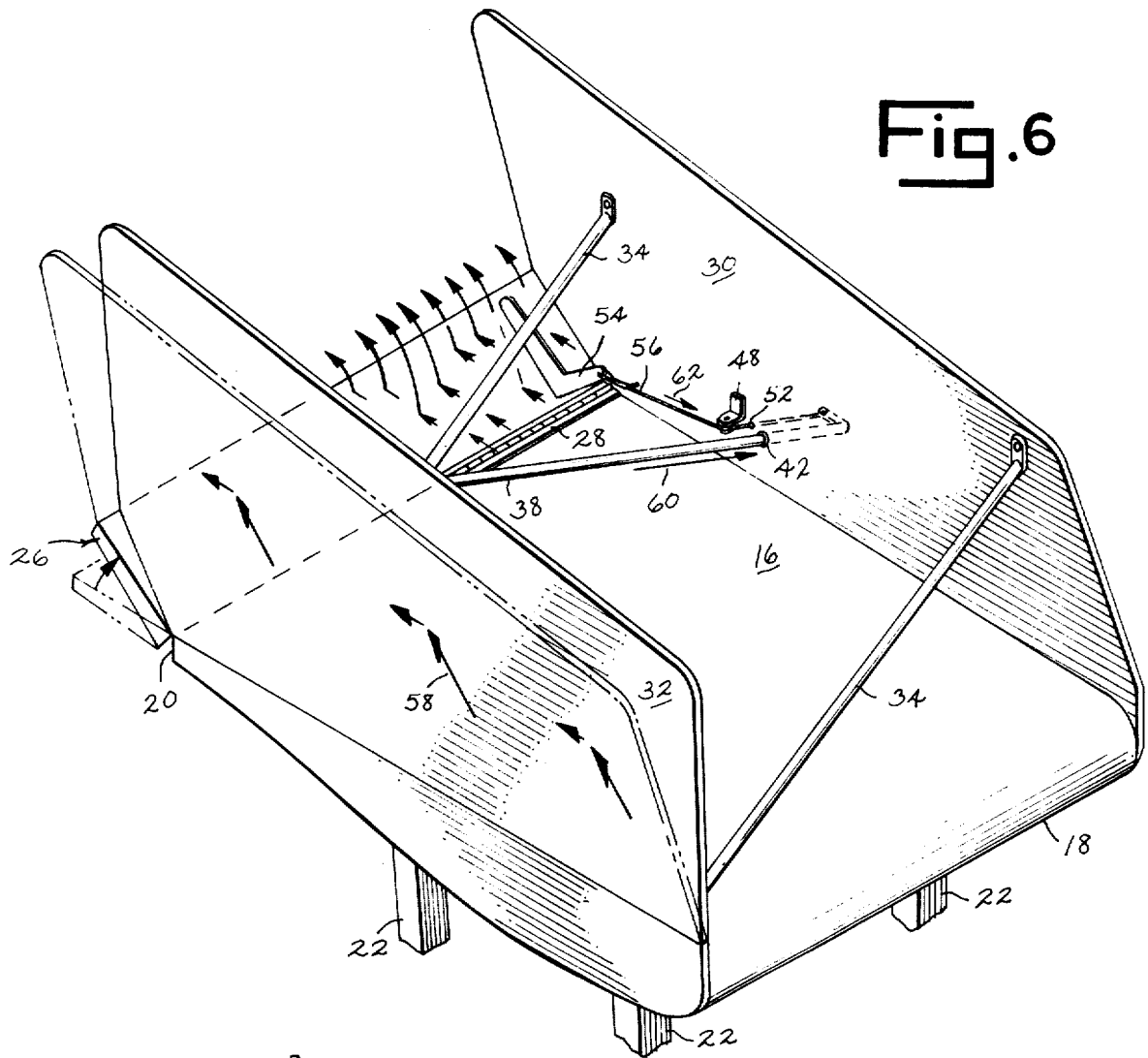
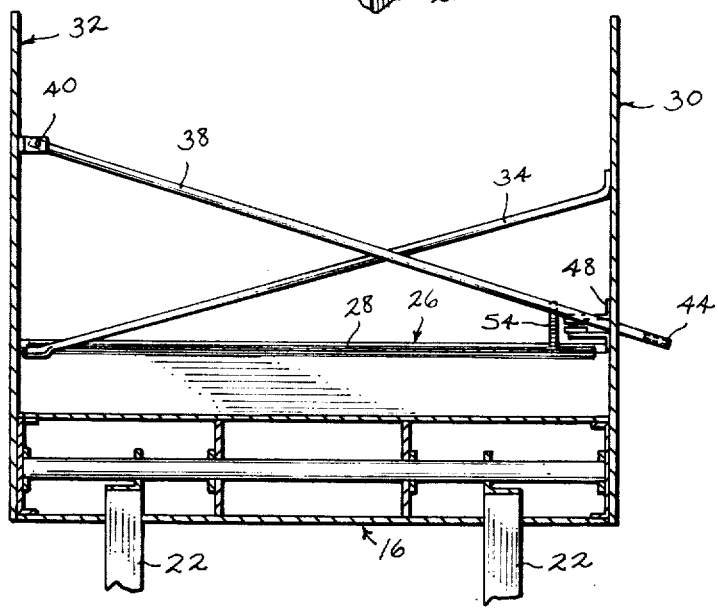

STABILIZER WING FOR A RACING VEHICLE

SUMMARY OF THE INVENTION

This invention relates to a stabilizer wing which is used with a racing vehicle for the purpose of increasing the tractive force between the wheels of the racing vehicle and the surface over which the vehicle is run.

In this invention the stabilizer wing is of an improved design and includes an airfoil which is secured to the racing vehicle and which has leading and trailing edges. A flap is pivotally connected to the trailing edge of the airfoil. At least one and preferably two rudders are also secured to the airfoil and extend upwardly therefrom. One rudder is fixedly connected to the airfoil while the remaining rudder is pivotally connected so as to swing under the influence of wind contact during movement of the racing vehicle. A suitable actuator system connects the pivoted rudder to the flap so that as the racing vehicle rounds a curve the pivoted rudder will swing upon wind contact causing the flap connected to the airfoil to be raised, thereby increasing the downward pressure upon the vehicle. During straight line travel of the racing vehicle the flap will assume an aligned aerodynamic flow position with the airfoil with the pivoted rudder being relocated. In this manner, the stabilizer wing serves to place an additional downward force upon the vehicle during turns so as to improve the traction and racing speed of the vehicle in the turns.

Accordingly, it is an object of this invention to provide an improved stabilizer wing for a racing vehicle in which the traction of the vehicle in a turn is increased.

Another object of this invention is to provide an improved stabilizer wing for a racing vehicle in which movable parts of the wing serve to increase the tractive force of the vehicle during turns.

Still another object of this invention is to provide an improved stabilizer wing which is for a racing vehicle and which is economical and of simplified construction.

Further objects of this invention will become apparent upon a reading of the invention's description.

BRIEF DESCRIPTION OF THE DRAWINGS

A preferred embodiment of this invention has been chosen for purposes of illustration and description wherein:

FIG. 5 is a cross sectional view taken along line 5—5 of FIG. 3.

FIG. 6 is a perspective view showing the stabilizer wing with moving parts, said parts shown in one operative position in solid line form and shown in a second operative position in broken line form.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
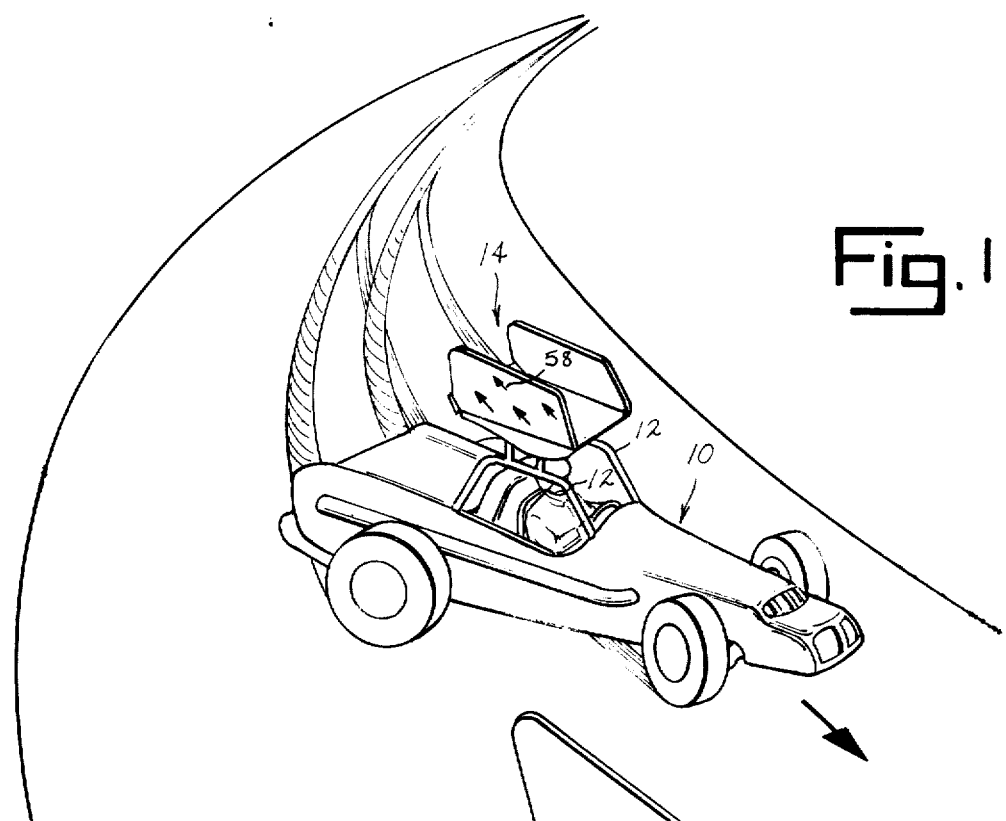
FIG. 1 is a perspective view of a racing vehicle having the stabilizer wing of this invention secured thereto.

In FIG. 1 a racing vehicle 10 is shown. Vehicle 10 includes roll bars 12 to which is secured the stabilizer wing 14 of this invention. Wing 14 includes an airfoil 16 which is of a rib frame construction having overlaid skin applied thereto forming an aerodynamic configuration. Airfoil 16 includes a leading edge 18 and a trailing edge 20. Vertical stanchions 22 are connected to transverse support rods 24 located within and forming a part of airfoil 16. The lower ends of stanchions 22 are connected to roll bars 12 of racing vehicle 10 and serve to secure wing 14 to the vehicle.

Figure 2:
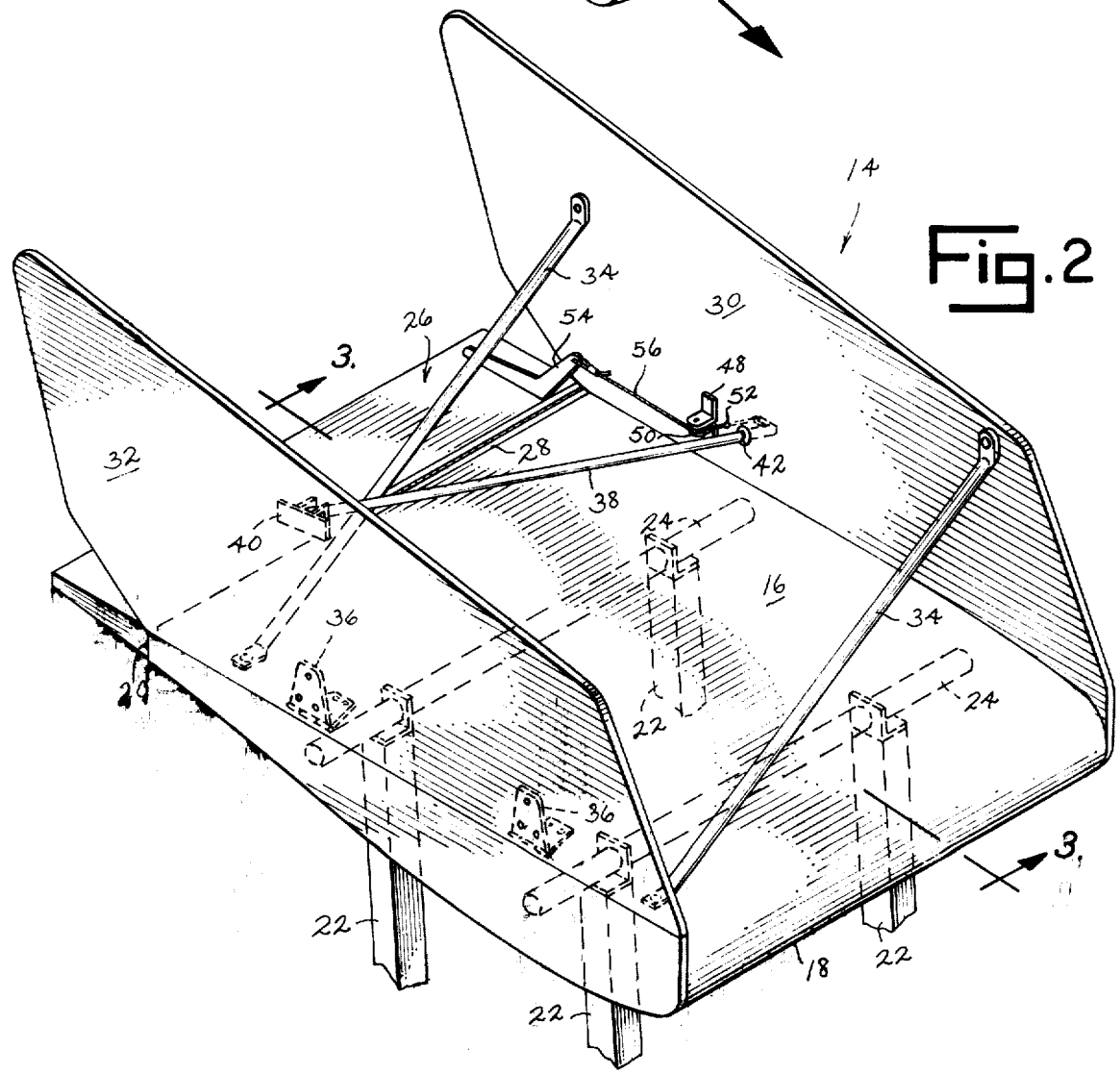
FIG. 2 is a perspective view of the stabilizer wing.
Figure 3:
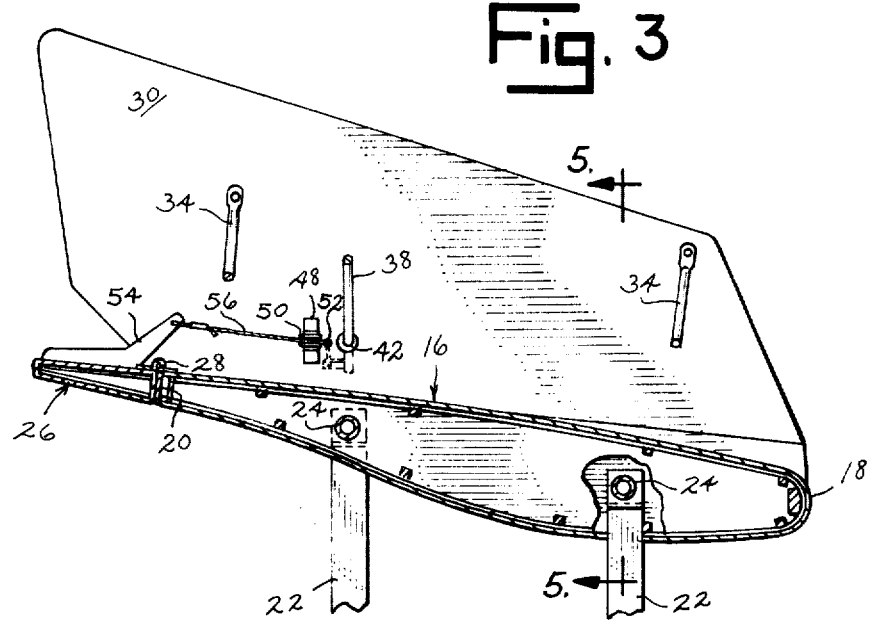
FIG. 3 is a sectional view taken along line 3—3 of FIG. 2.
Figure 4:
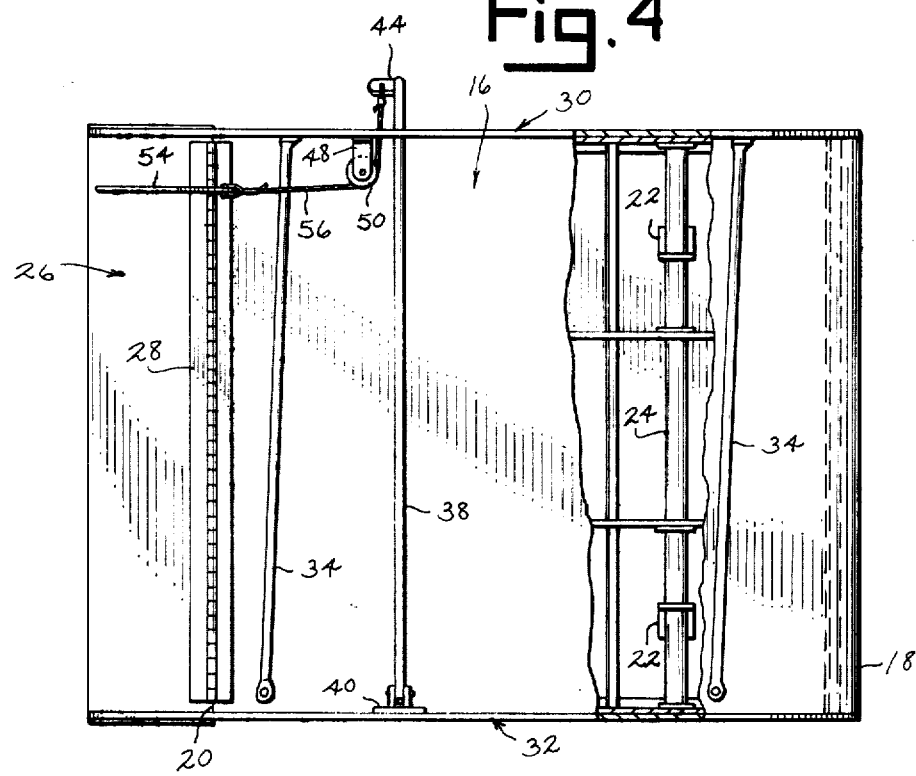
FIG. 4 is a top view of the stabilizer wing with portions of the airfoil thereof broken away for purposes of illustration.

Wing 14 includes a flap 26 which is connected by a hinge 28 to the trailing edge 20 of airfoil 16. Flap 26 preferably extends from one side edge to the other of airfoil 16 and is shiftable between a lower position as illustrated in FIGS. 2 and 3 in which it complements the aerodynamic configuration of airfoil 16 and an upper, tilted position as best illustrated in solid lines in FIG. 6. Attached to airfoil 16 along each of its side edges and constituting a part of wing 14 are a pair of rudders 30 and 32. Rudder 30 is fixedly positioned relative to airfoil 16 and is supported by diagonal braces 34 which extend between the rudder and the upper surface of the airfoil. The remaining rudder 32 is pivotally connected at its lower edge to airfoil 16 by means of one or more hinges 36. The lower edge of rudder 32 rests upon the side edge of airfoil 16 with hinges 36 being positioned at the inside of the rudder so that the rudder will be shiftable between an upright position, as that illustrated in FIGS. 2 and 5 and in broken lines in FIG. 6, generally paralleling the longitudinal dimension of vehicle 10 and an inwardly tilted position partially overlying airfoil 16, such as that shown in solid lines in FIG. 6. Fixed rudder 30 also generally parallels the longitudinal dimension of vehicle 10.

A rigid actuator rod 38 extends between rudders 30 and 32. One end portion of actuator rod 38 is pivotally connected by a bracket 40 to pivoted rudder 32 at its inside face and upwardly spaced from its hinged pivot connection. The opposite end portion of actuator rod 38 extends through an opening 42 in fixed rudder 30. A bracket 48 mounting a pulley 50 is secured to the inside face of fixed rudder 30 at the approximate level of opening 42 therein between the opening and flap 26. A small opening 52 is formed in rudder 32 between pulley 50 and actuator rod opening 42. A rigid arm part 54 is secured to flap 26 at its upper surface. Arm part 54 projects toward leading edge 18 of airfoil 16 and is located adjacently inwardly from rudder 30. A cable 56 has one end secured to end 44 of actuator rod 38 where it extends through rudder opening 42. Cable 56 extends from actuator rod end 44 through opening 52 in rudder 30, around pulley 50 and is secured to arm part 54.

The operation of wing 16 will now be described. In a customary left-hand racing turn, such as that illustrated in FIG. 1, the rear of vehicle 10 is forced outwardly so as to cause the vehicle to be angled relative to the direction of vehicle movement. This angulation of vehicle 10 causes the wind to contact the outside of upright pivoted rudder 32 as indicated by arrows 58 in FIG. 1 and 6. This wind contact upon rudder 32 causes the rudder to pivot or tilt inwardly from its broken line upright position into the solid line position, both shown in FIG. 6, which in turn causes actuator rod 38 to move longitudinally in the direction of arrow 60. This movement of actuator rod 38 causes cable 56 to be pulled in the direction of arrow 62 and flap 26 to be pivoted about its hinge 28 from the broken line position into the upwardly tilted solid line position in FIG. 6. When in its upwardly tilted position, as shown in FIG. 6, the flap will be more directly contacted by wind 64, thus causing an increased downward force upon airfoil 16 and racing vehicle 10 so as to increase the traction of the racing vehicle. Additionally, pivoted rudder 32 when in its tilted position will cause an inward and additional downward force upon vehicle 10.

As vehicle 10 comes out of the curve and enters the straightaway, the wind, while still striking upwardly tilted flap 26, will no longer directly contact the outer face of tilted rudder 32. This causes the flap to shift from its upper position into its lower position aerodynamically configured with airfoil 16. This movement of flap 26 causes a pull upon cable 56 and movement of actuator rod 32 in the direction of pivoted rudder 32 which in turn causes rudder 32 to be shifted from its inwardly tilted to its upright position where it remains until the vehicle turns again. By the use of pivoted rudder 32, the aerodynamic properties of airfoil 16 and cooperating flap 26 are changed so that in turn the downward pressure produced by wing 14 upon vehicle 10 is increased to increase the traction between the wheels of the vehicle and the road surface.

In some constructions of the stabilizer wing of this invention it may be preferable to use but a single rudder which would be in pivoted form and located at a selected location upon the main airfoil of the wing. While it is standard procedure for racers to compete in left-handed turns, it should be obvious that if a track is designed with right-hand turns the pivoted rudder 32 will be placed upon the opposite side of airfoil 16 of wing 14.

It is to be understood that the invention is not to be limited to the details above given but may be modified within the scope of the appended claims.

What I claim is:

1. A stabilizer wing for use with a racing vehicle, said wing comprising an airfoil, means securing said airfoil to said vehicle in a position generally horizontal whereby wind in striking said airfoil during travel of said vehicle forces said vehicle downwardly against the road surface, said airfoil having a leading edge and a trailing edge, flap means pivotally connected to said airfoil at its trailing edge, a rudder projecting above and extending generally along the longitudinal dimension of said airfoil, means pivotally connecting said rudder to said airfoil wherein said rudder will be caused to shift about its pivot connection toward the airfoil when subjected to oncoming wind during travel of said vehicle in a turn, said flap means having an upper and a lower position, means interconnecting said rudder and flap means for causing pivotal movement of said flap means relative to the airfoil as said rudder shifts about its pivot connection with said flap means moving from its lower into its upper position as said vehicle is traveling in said turn and also for causing pivotal movement of said rudder relative to the airfoil as said flap means shifts about its pivot connection with said rudder moving away from the airfoil as said vehicle is traveling down a straightaway.

2. The stabilizer wing of claim 1 wherein said rudder has an upright position generally paralleling the direction of travel of said vehicle when the vehicle travels down said straightaway and a second position shifted in the direction of turn when said vehicle travels about said turn.

3. The stabilizer wing of claim 2 wherein said rudder and flap interconnecting means includes means for causing said rudder to shift from its second into its upright position as said flap shifts from its upper into its lower position due to the force of wind upon said flap during straight line travel of said vehicle.

4. The stabilizer wing of claim 3 and a second rudder projecting above and extending generally along the longitudinal dimension of said airfoil spaced laterally from said first mentioned rudder, means securing said second rudder in a fixed position relative to said airfoil.

5. The stabilizer wing of claim 4 wherein said second rudder extends in an upright position.

6. The stabilizer wing of claim 5 wherein said rudder and flap interconnecting means includes a rigid actuator rod connected at one end to said first mentioned rudder at a location spaced from the pivot connection of the rudder to the airfoil, the other end of said actuator rod extending slidably through said second rudder, cable and pulley means connected between said other actuator rod end and said flap at a location spaced from the pivot connection of the flap to the airfoil wherein movement of said first mentioned rudder into its second position causes said actuator rod to shift in the direction of said second rudder with said cable and pulley means causing said flap to be shifted from its lower into its upper position.

* * * * *